United States Patent Office 2,881,207
Patented Apr. 7, 1959

2,881,207

RECOVERY OF COLORLESS AQUEOUS SOLUTIONS OF AMINO-SULFONIC ACIDS

Hans Feichtinger and Siegfried Puschhof, Duisburg-Beeck, Germany, assignors to Ruhrchemie Aktiengesellschaft, Oberhausen-Holten, Germany, a corporation of Germany No Drawing. Application May 8, 1957
Serial No. 657,739

Claims priority, application Germany May 9, 1956

11 Claims. (Cl. 260—513)

This invention relates to new and useful improvements in the recovery of colorless aqueous solutions of amino-sulfonic acids.

Amino-sulfonic acids may be produced by the sulfo-chlorination and subsequent hydrolysis of aliphatic amine hydrochlorides. The conversions proceeds in accordance with the following reaction scheme:

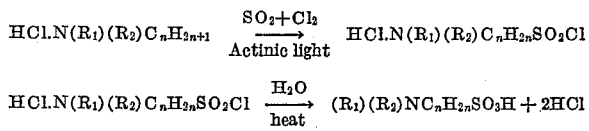

$$HCl.N(R_1)(R_2)C_nH_{2n+1} \xrightarrow[\text{Actinic light}]{SO_2+Cl_2} HCl.N(R_1)(R_2)C_nH_{2n}SO_2Cl$$

$$HCl.N(R_1)(R_2)C_nH_{2n}SO_2Cl \xrightarrow[\text{heat}]{H_2O} (R_1)(R_2)NC_nH_{2n}SO_3H + 2HCl$$

in which $R_1$ and $R_2$ represent hydrogen or lower alkyl radicals as, for example, having one or two carbon atoms, while $n$ represents a whole number. The size of the hydrocarbon radical, represented by $C_nH_{2n+1}$ is unimportant and may contain any desired number of carbon atoms.

The sulfo-chlorination reaction is generally effected while irradiating with ultra violet light and the sulfo-chlorination reaction mixture, in addition to the amino-alkyl-sulfochloride hydrochlorides and unconverted amine hydrochlorides, contains chloramine hydrochlorides formed as a by-product.

For the hydrolysis, the reaction product from the sulfo-chlorination is dissolved in water and hydrolyzed by boiling for several hours under reflux. The aqueous reaction solution obtained from the hydrolysis contains in addition to the amino sulfonic acids, the chloramines and amines and is discolored by these by-products.

In order to render the amino sulfonic acids suitable for further use, as for example, in the production of surface active agents such as wetting agents, emulsifiers or detergents, the same must be separated from the chloramines and amines and should preferably be in the form of a colorless, aqueous solution.

In the past, this recovery entailed a good deal of difficulty and resulted in a relatively large loss of the amino sulfonic acids. The separation was conventionally effected by precipitating the amino sulfonic acids from the hydrolysis reaction mixture with alcohols at a low temperature after evaporation under vacuum. This separation is highly uneconomical since only about 50 to 70% of the amino sulfonic acids actually present in the mixture could be separated in this manner. Due to the dissolving effects of the accompanying substances in the reaction solution, the remainder of the amino sulfonic acids would remain in the alcohol and could only be separated therefrom with a great deal of difficulty.

It was also proposed to effect the separation and purification by initially removing the unconverted alkylamine hydrochloride and the chlorinated alkylamine hydrochloride formed as a by-product in the sulfo-chlorination, by steam distillation after alkalization. This proposal, however, had the disadvantage that the heating for the steam distillation would cause a serious decomposition of the free chloralkylamines and would result in a darkening of the aminosulfonic acid solution.

One object of this invention is a novel process for the recovery of a colorless aliphatic amine sulfonic acid solution in high yield from the aqueous reaction mixture obtained from the sulfo-chlorination and subsequent hydrolysis of an aliphatic amine hydrochloride. This, and still further objects, will become apparent from the following description:

In accordance with the invention, it has been found that a practically quantitative recovery of the amino sulfonic acid in the form of a colorless, aqueous solution, may be obtained if the hydrolyzed sulfo-chlorination mixture is contacted with an alkali to neutralize the hydrochloric acid and the free amines and chloramines formed from the hydrochlorides are extracted with an organic, substantially water immiscible, i.e., non-polar, solvent.

Very surprisingly, the extraction of the basic hydrolyzed sulfo-chlorination mixture will not remove the amino sulfonic acids from the aqueous phase while practically quantitatively removing the amines and chloramines and only requires a single extraction stage.

The remaining aqueous solution of the amino sulfonic acids is colorless and only contains small residual quantities of amines which may, if desired, be removed by a steam distillation effected for a short period of time.

The amounts of solvent used for the extraction, in accordance with the invention, are critical and may vary between 0.3 to 2 parts by weight of solvent to 1 part by weight of a free amine. Preferably an amount of solvent equal in weight to the free amines is used. Any non-polar, water immiscible, solvent which is inert with respect to the components in the reaction mixture may be used for the extraction. Particularly well suited solvents include aliphatic or aromatic hydrocarbons which are liquid under normal conditions, e.g. heptane or toluene. Good results are also obtained with chlorinated hydrocarbons, such as carbon tetrachloride.

The extraction is preferably effected at normal atmospheric pressure. However, elevated pressures of as high as about 5 atmospheres may be used. The extraction temperature is preferably adjusted to 0–50° C. Suitable alkali compounds are sodium hydroxide or potassium hydroxide. The quantity of alkali is dependent upon the amount of chloramine hydrochlorides present and the amounts of hydrogen chloride in solution. The amount of alkali to be introduced is previously determined by analysis. A simple pH determination is not possible since the amines involved are themselves strongly alkaline.

About 0.5 to 3 parts by weight of the free amines can be dissolved in one part by weight of the solvent such as carbon tetrachloride. When using more than about 2 parts by weight of the solvent per part by weight of free amine, inseparable emulsions are formed with the aqueous phase. When using less than about 0.3 part of solvent per part by weight of free amine, the solvent practically completely dissolves in the hydrolysis mixture so that the separation will not occur.

Very surprisingly, a 95 to 98% separation of the free amines can be effected in a single-stage extraction with the small quantity of solvent within the range set forth above.

The process, in accordance with the invention, is carried out, for example, in such a manner that the hydrolyzed aqueous sulfo-chlorination mixture which, for example, when starting with butyl amine consists of 1-aminobutane-sulfonic acid-3 and 1-aminobutane-sulfonic acid-4, unconverted butyl amine hydrochloride and chlorinated butyl amine hydrochloride is mixed with a quantity of alkali which is equivalent to the hydrochloride content and the amines thus liberated are extracted in a single stage with 0.3 to 2 parts by weight per part by weight of the amines of the substantially water immiscible organic solvent such as the carbon tetrachloride.

The aqueous solutions of the amino sulfonic acid obtained in accordance with the invention are water white and contain the amino sulfonic acid in practically quantitative yield. The solutions may additionally contain the halide salt from the neutralization such as sodium chloride as a neutral salt and may be used directly in this form, as for example, for further organic syntheses such as for the production of surface active agents such as wetting agents, emulsifiers or detergents.

The following examples are given by way of illustration and not limitation.

*Example 1*

In a vessel of 10 liters capacity provided with a 500 watt ultraviolet lamp, a stirrer, a gas inlet pipe, a thermometer, a reflux condenser and a gas outlet pipe, 365 grams (5.0 mols) of dry n-butylamine were dissolved in 8 liters of carbon tetrachloride. The solution of n-butylamine was neutralized within 1 hour with 182.3 grams of hydrogen chloride and then sulfochlorinated with 18 liters/hr. of $SO_2$ and 16 liters/hr. of $Cl_2$ at a temperature of 55–60° C. while radiating with ultraviolet light. After 11 hours of sulfochlorination, the crystalline reaction product was filtered in a Buechner funnel. On the funnel there remained 1420 grams of the carbon tetrachloride-containing sulfo-chlorination mixture from which another 500 grams of carbon tetrachloride separated after dissolution in 900 cc. of water. The dry sulfo-chlorination mixture had the following composition as determined by elementary analysis:

| | Percent |
|---|---|
| C | 25.45 |
| H | 5.92 |
| O | 12.70 |
| N | 7.42 |
| S | 12.64 |
| Cl | 35.94 |

Accordingly, the salt mixture consists of

82% by weight of $HCl.NH_2\text{-}nC_4H_8SO_2Cl$
14% by weight of $HCl.NH_2\text{-}n\text{-}C_4H_8Cl$
5% by weight of $HCl.NH_2\text{-}n\text{-}C_4H_9$ The saponification of the sulfo-chlorination mixture was effected in a column heated to 150° C. in which the aqueous solution of the sulfo-chlorination mixture was treated with steam having a temperature of 160° C. in countercurrent flow. The saponification product collected in the bottoms of the column while the hydrochloric acid formed distilled as the overhead product. After 10 hours of reaction, a total of 1490 grams of saponification product and 5200 grams of aqueous hydrochloric acid were obtained from 1820 grams of the aqueous solution of the sulfo-chlorination mixture.

After addition of 100 grams of carbon tetrachloride and 400 grams of 40% sodium hydroxide solution, the saponification product obtained was alkalized for 1 hour at a maximum temperature of 30° C. in a vessel provided with a cooling jacket and a drain cock while intensively stirring. 225 grams of the dark brown carbon tetrachloride-amine layer containing 88 grams of chlorinated n-butylamine ($NH_2\text{-}n\text{-}C_4H_8Cl$) and 29 grams of n-butylamine ($NH_2\text{-}n\text{-}C_4H_9$) collected at the bottom of the vessel.

The aqueous phase of the saponification mixture was subsequently subjected to steam distillation for 1.5 hours. After the neutralization of the excess alkali with dilute hydrochloric acid, a water-white aminobutane-sulfonic acid solution was obtained in amount of 2050 grams and having the following composition:

26.6% by weight of 1-aminobutane-sulfonic acid-3 and 1-aminobutane-sulfonic acid-4
11.4% by weight of sodium chloride
62.0% by weight of water.

From this, the yield of aminobutane-sulfonic acids was calculated to be 71.3% of the theoretically possible quantity based on n-butylamine charged.

*Example 2*

In the manner described in Example 1, 436 grams (5 mols) of dry N-methyl-n-butylamine were dissolved in 8 liters of carbon tetrachloride. After neutralization with hydrogen chloride, 18 liters of sulfur dioxide ($SO_2$) and 16 liters of gaseous chlorine were hourly introduced into the solution at 50° C. and at normal atmospheric pressure while radiating the solution with ultraviolet light. After having introduced the mixture of sulfur dioxide and gaseous chlorine for 12 hours, the sulfochlorination was discontinued and the crystalline reaction product was separated from the solution by filtration. Following this, the product obtained was saponified with water vapor at 130° C. The aqueous solution of the saponification product thereby obtained was mixed with 200 grams of toluene. Then 750 grams of a solution containing 30% by weight of potassium hydroxide (KOH) were added at 20° C. with appropriate cooling. This resulted in the separation of 475 grams of a layer consisting of toluene and amine compounds and containing 179 grams of chlorinated N-methyl-n-butylamine and 90 grams of N-methyl-n-butylamine. After steam distillation for 1 hour and subsequent neutralization of the excess potassium hydroxide with dilute hydrochloric acid to a pH value of 7.5, there resulted 2230 grams of a water white solution containing 18.5% by weight of N-methyl-1-aminobutane-sulfonic acid-3.

*Example 3*

In accordance with Example 2, 436 grams (5 mols) of n-pentylamine were dissolved in 8 liters of carbon tetrachloride and neutralized with hydrogen chloride. Thereafter, the solution was sulfo-chlorinated for 8 hours at 45° C. while radiating with ultraviolet light introducing 22 liters/hr. of sulfur dioxide and 20 liters/hr. of gaseous chlorine into the reaction solution at normal atmospheric pressure. This resulted in a reaction product comprising 70% by weight of $HCl.NH_2\text{-}n\text{-}C_5H_{10}SO_2Cl$, 20% by weight of $HCl.NH_2\text{-}n\text{-}C_5H_{10}Cl$, and 10% by weight of $HCl.NH_2\text{-}n\text{-}C_5H_{11}$. This sulfo-chlorination mixture was saponified with steam at 120° C. This resulted in 1700 grams of an aqueous solution which was mixed with 150 grams of n-heptane and, at 40° C., with 700 grams of an aqueous solution containing 30% by weight of potassium hydroxide (KOH). Thereby, 365 grams of a layer comprising n-heptane and amine compounds separated. The aqueous amino-sulfonic acid solution was distilled with steam for 1 hour and then neutralized with dilute hydrochloric acid to a pH value of 7.0. The final product obtained consisted of 1500 grams of a solution containing 20% by weight of 1-aminopentane-sulfonic acid-x.

We claim:

1. Process for the recovery of colorless alkyl amino sulfonic acid solutions from aqueous mixtures containing alkyl amino sulfonic acids, alkyl chloramines and alkyl amines which comprises extracting the amines and chloramines from such a mixture with 0.3 to 2 parts by weight per part by weight of said amines of a substantially water immiscible organic solvent selected from the group consisting of hydrocarbons and chlorinated hydrocarbons, and recovering the colorless amino sulfonic acid solution formed.

2. Process according to claim 1, in which said extraction is effected with about 1 part by weight of said solvent to part by weight of said amines.

3. Process according to claim 1, in which said substantially water immiscible organic solvent is carbon tetrachloride.

4. Process according to claim 3, in which said extraction is effected with about 1 part by weight of said carbon tetrachloride per part by weight of said amines.

5. Process according to claim 1, in which said extraction is effected in a single stage.

6. Process for the recovery of colorless alkyl amino sulfonic acid solutions from the aqueous reaction mixtures obtained from the sulfo-chlorination and subsequent hydrolysis of alkyl amine hydrochlorides which comprises extracting amines and chloramines present in the hydrolysate after the addition of an amount of alkali to the hydrolysate to render it alkaline with 0.3–2 parts by weight per part by weight of said amines of a substantially water immiscible organic solvent selected from the group consisting of hydrocarbons and chlorinated hydrocarbons and recovering the colorless amino sulfonic acid solution formed.

7. Process according to claim 6, in which said extraction is effected with about 1 part by weight of said organic solvent to part by weight of said amines.

8. Process according to claim 6, in which said organic solvent is carbon tetrachloride.

9. Process according to claim 8, in which said extraction is effected with about 1 part by weight carbon tetrachloride per part by weight of said amine.

10. Process according to claim 6, in which said extraction is effected in a single extraction stage.

11. Process according to claim 6, in which said alkalinization is effected with sodium hydroxide.

References Cited in the file of this patent

UNITED STATES PATENTS 2,806,056    Feichtinger et al. _____ Sept. 10, 1957

OTHER REFERENCES

Shriner et al.: The Systematic Identification of Organic Compounds, Fourth Edition, 1956, pp. 78–81 (4 pages).

Seidell: Solubilities of Organic Compounds, vol. II, third edition, 1941, pp. 317, 318 (2 pages).